US011509141B2

(12) United States Patent
Danielsen

(10) Patent No.: US 11,509,141 B2
(45) Date of Patent: Nov. 22, 2022

(54) WIND TURBINE POWER CONSUMPTION CONTROL

(71) Applicant: VESTAS WIND SYSTEMS A/S, Aarhus N (DK)

(72) Inventor: Niels Erik Danielsen, Brabrand (DK)

(73) Assignee: VESTAS WIND SYSIEMS A/S, Aarhus N (DK)

( * ) Notice: Subject to any disclaimer, the term of this patent is extended or adjusted under 35 U.S.C. 154(b) by 0 days.

(21) Appl. No.: 17/259,449

(22) PCT Filed: Jul. 2, 2019

(86) PCT No.: PCT/DK2019/050211
§ 371 (c)(1),
(2) Date: Jan. 11, 2021

(87) PCT Pub. No.: WO2020/011321
PCT Pub. Date: Jan. 16, 2020

(65) Prior Publication Data
US 2021/0281080 A1 Sep. 9, 2021

(30) Foreign Application Priority Data
Jul. 10, 2018 (DK) .............. PA 2018 70478

(51) Int. Cl.
H02J 3/38 (2006.01)
F03D 80/00 (2016.01)
H02J 9/06 (2006.01)

(52) U.S. Cl.
CPC .............. H02J 3/381 (2013.01); F03D 80/00 (2016.05); H02J 9/06 (2013.01); H02J 2300/28 (2020.01)

(58) Field of Classification Search
CPC ...... H02J 3/381; H02J 3/38; H02J 9/06; H02J 2300/28; F03D 80/00
See application file for complete search history.

(56) References Cited

U.S. PATENT DOCUMENTS 6,476,519 B1 11/2002 Weiner
6,921,985 B2 * 7/2005 Janssen ................... H02J 3/381
290/55

(Continued)

FOREIGN PATENT DOCUMENTS

EP 2709266 A2 3/2014
EP 2996219 A1 3/2016

(Continued)

OTHER PUBLICATIONS

PCT International Search Report for PCT/DK20019/050211 dated Aug. 10, 2019.

(Continued)

Primary Examiner — Robert L Deberadinis
(74) Attorney, Agent, or Firm — Patterson + Sheridan, LLP

(57) ABSTRACT

A power management module and method for controlling power consumption of consumers in a wind turbine system. Each power management module in the wind turbine system is configured to determine a voltage level of a power supply bus of the wind turbine system and then control a level of power consumption of one or more consumers coupled to the power supply bus based at least in part on the determined voltage level of the power supply bus. Power consumption may thereby be managed throughout the wind turbine system, without requiring a dedicated centralised controller and communications infrastructure.

20 Claims, 7 Drawing Sheets

(56) References Cited

U.S. PATENT DOCUMENTS

| | | | | |
|---|---|---|---|---|
| 7,602,075 | B2* | 10/2009 | Erdman | F03D 7/0224 |
| | | | | 290/40 R |
| 8,116,914 | B2* | 2/2012 | Oohara | F03D 7/0224 |
| | | | | 700/20 |
| 10,107,260 | B2* | 10/2018 | Ritter | F03D 7/0284 |
| 2004/0145188 | A1 | 7/2004 | Janssen et al. | |
| 2011/0175355 | A1 | 7/2011 | Rosenvard | |
| 2012/0049626 | A1* | 3/2012 | Xu | H02J 3/14 |
| | | | | 307/41 |
| 2013/0175801 | A1* | 7/2013 | Matzen | H02P 9/10 |
| | | | | 290/44 |
| 2014/0291990 | A1* | 10/2014 | Sala | H02J 11/00 |
| | | | | 290/44 |
| 2015/0008671 | A1 | 1/2015 | Palomares Rentero et al. | |
| 2017/0145989 | A1 | 5/2017 | Ritter et al. | |

FOREIGN PATENT DOCUMENTS

| | | |
|---|---|---|
| WO | 2016112918 A1 | 7/2016 |
| WO | 2020011321 A1 | 1/2020 |

OTHER PUBLICATIONS

PCT Written Opinion of the International Searching Authority for Application No. PCT/DK2019/050211 dated Feb. 12, 2019.
Danish Patent and Trademark Office Search Report for Application No. PA 2018 70478 dated Feb. 12, 2019.

* cited by examiner

WIND TURBINE POWER CONSUMPTION CONTROL

FIELD OF THE INVENTION

The present invention relates to a power management module for a wind bine system and to a method for controlling power consumption in a wind turbine system.

BACKGROUND OF THE INVENTION

Wind turbine systems include a number of different consumers in different parts of the wind turbine, for example in the tower, the nacelle, the hub, etc. Consumers are devices, components or systems within the wind turbine system that consume electrical power. Some examples of typical consumers are yaw systems, cooling systems, lubrication systems, blade pitch systems, control systems, service lighting, service lifts, etc.

In grid connected wind turbines, consumers can draw power from the grid in order to operate. However, at times, power from the grid may be lost, for example as a result of damage to the grid connection, or a power cut at the grid, etc. Even during no-grid periods, some consumers may still need to be powered. Consequently, grid connected wind turbines may have a backup power system, such as batteries, so that power can still be supplied to consumers that need it during no-grid periods.

However, batteries have a finite amount of energy and no-grid periods may potentially last for a long period of time (for example, if the wind turbine is an off-shore wind turbine, a no-grid period may be caused by damage to an undersea cable, which could take many months to repair). Increasing the capacity of batteries may be difficult due to limitations in space available for the batteries and due to the increased costs that this would incur. Consequently, to prolong the amount of time a backup system can power consumers that need to be powered during no-grid periods, it may be desirable to minimise power consumption of wind turbine systems during no-grid periods.

SUMMARY OF THE INVENTION

A first aspect of the invention provides a power management module for a wind turbine system comprising one or more consumers, the power management module being configured to: determine a voltage level of a power supply bus of a wind turbine system; and control a level of power consumption of one or more consumers coupled to the power supply bus based at least in part on the determined voltage level of the power supply bus.

The power management module may control of the level of power consumption of the one or more consumers is based at least in part on a comparison of the voltage level of the power supply bus against a first threshold voltage.

Control of the level of power consumption of the one or more consumers may be based at least in part on a comparison of the voltage level of the power supply bus against a first threshold voltage.

At least one of the one or more consumers may be a non-essential consumer, in which case, if the voltage level of the power supply bus is greater than the first threshold voltage, the power management module may be configured to control the level of power consumption of the non-essential consumer to a first power level; and if the voltage level of the power supply bus is less than the first threshold voltage, the power management module may be configured to control the level of power consumption of the non-essential consumer to a second power level, wherein the first power level is greater than the second power level.

Control of the level of power consumption of the one or more consumers may be further based at least in part on a comparison of the voltage level of the power supply bus against a second threshold voltage, wherein the first threshold voltage is greater than the second threshold voltage level.

The power management module may be further configured to control the level of power consumption of the one or more consumers between a first power level and a second power level, wherein the first power level is greater than the second power level. For example, the first power level may be a non-zero level of power consumption and the second power level may be a zero level of power consumption, or a non-zero level of power consumption that is less than the amount of power consumption at the first power level.

At least one of the one or more consumers may be a low-importance non-essential consumer, in which case, if the voltage level of the power supply bus is less than the first threshold voltage, the power management module may be configured to control the level of power consumption of the low-importance non-essential consumer to second power level, and if the voltage level of the power supply bus is greater than the second threshold voltage, the power management module may be configured to control the level of power consumption of the low-importance non-essential consumer to the first power level.

At least one of the one or more consumers may be a high-importance non-essential consumer, in which case, if the voltage level of the power supply bus is less than the second threshold voltage, the power management module may be configured to control the level of power consumption of the high-importance non-essential consumer to the second power level, and if the voltage level of the power supply bus is greater than the second threshold voltage, the power management module may be configured to control the level of power consumption of the high-importance non-essential consumer to the first power level.

The one or more consumers may be coupled to the power supply bus by respective one or more controllable switches, wherein the power management module is configured to control the one or more controllable switches to control the level of power consumption of the one or more consumers. For example, the power management module may be configured to control the one or more controllable switches between two states: a closed state, to couple the one or more consumers to the power supply bus, and an open state, to de-couple the one or more consumers from the power supply bus.

The power management module may be further configured to: determine a voltage level and/or a current at an input of each of the one or more consumers; wherein control of the level of power consumption of the one or more consumers is further based at least in part on the determined voltage level and/or current at the input of each of the one or more consumers.

Each of the one or more controllable switches may comprise a transistor, in which case the power management module may be further configured to, when controlling a transistor to couple a consumer to the power supply bus, control a level of conduction of the transistor based on the determined voltage level and/or current at the input of the consumer to protect against current inrush to the consumer.

The power management module may be further configured to, when controlling the switches of a plurality of consumers to couple the plurality of consumers to the power supply bus, stagger in time the coupling of at least some of the consumers so as to provide overload protection for the power supply bus.

A second aspect of the invention provides a wind turbine system comprising: a power supply bus; one or more consumers coupled to the power supply bus; the power management module of the first aspect of the invention to control a level of power consumption of at least one of the one or more consumers; a primary power source coupled to the power supply bus for providing a first power supply voltage; and a backup power source coupled to the power supply bus for providing a second power supply voltage in the event of a failure in the primary power source, wherein the first power supply voltage is greater than the second power supply voltage.

The backup power source may be further configured to provide either the second power supply voltage or a third power supply voltage to the power supply bus, wherein the second power supply voltage is greater than the third power supply voltage.

The backup power source may comprise a battery, in which case the wind turbine system may be further configured to control the backup power source to provide either the second power supply voltage or the third power supply voltage to the power supply bus based at least in part on the remaining energy stored in the battery.

A third aspect of the invention provides a method for controlling a level of power consumption of one or more consumers in a wind turbine system, the method comprising: determining a voltage level of a power supply bus of the wind turbine system; and controlling a level of power consumption of the one or more consumers coupled to the power supply bus based at least in part on the determined voltage level of the power supply bus.

BRIEF DESCRIPTION OF THE DRAWINGS

Embodiments of the invention shall now be described, but way of example only, with reference to the accompanying drawings, in which.

DESCRIPTION OF EMBODIMENTS

The present disclosure provides a power management module configured to help manage power consumption of consumers in a wind turbine system. It has been realised by the inventors that in wind turbine power systems, when a backup power supply is used to provide power to a power supply bus (from which the consumers may draw power), the voltage level on the bus is typically lower than when the primary power source (for example, a grid supply) is providing power to the power supply bus. The inventors have therefore developed a power management module that controls the level of power consumption of one or more consumers based at least in part on the voltage level on the power supply bus. By determining the voltage level on the power supply bus, the power management module can determine whether the primary or the backup power supply is providing power to the power supply bus. If it is detected that the backup power supply is providing power, the power management module may reduce the power consumption of any non-essential consumers that are under its control (for example, by disconnecting those consumers from the power supply bus) and maintain power for essential consumers (for example, control systems, yaw systems, etc). Likewise, if it is later detected that the primary power source is now providing power to the power supply bus, the power management module may increase the power consumption of any non-essential consumers that are under its control (for example, by reconnecting those consumers to the power supply bus), thereby enabling those consumers to operate fully once again. In this way, power consumption of the wind turbine system as a whole may be reduced during no grid periods, thereby prolonging the time for which the wind turbine system can operate during a no-grid period, whilst still maintaining essential functionality of the wind turbine system.

Furthermore, power supply buses are a standard feature of wind turbine systems for powering consumers located throughout a wind turbine (for example, in the tower, nacelle, hub, etc). By using the power supply bus to determine the current status of power source, control of consumer power consumption may be distributed across various different power management modules, each positioned in different parts of the wind turbine, without requiring a complex central control system and communications infrastructure. This may be particularly beneficial for control of consumers located in regions such as the nacelle and hub, where the communications infrastructure between a central controller in one part of the wind turbine system and consumers in another part of the wind turbine system would require a rotatory type communications interface, which may be expensive and difficult to achieve with limited space resources.

Figure 1:
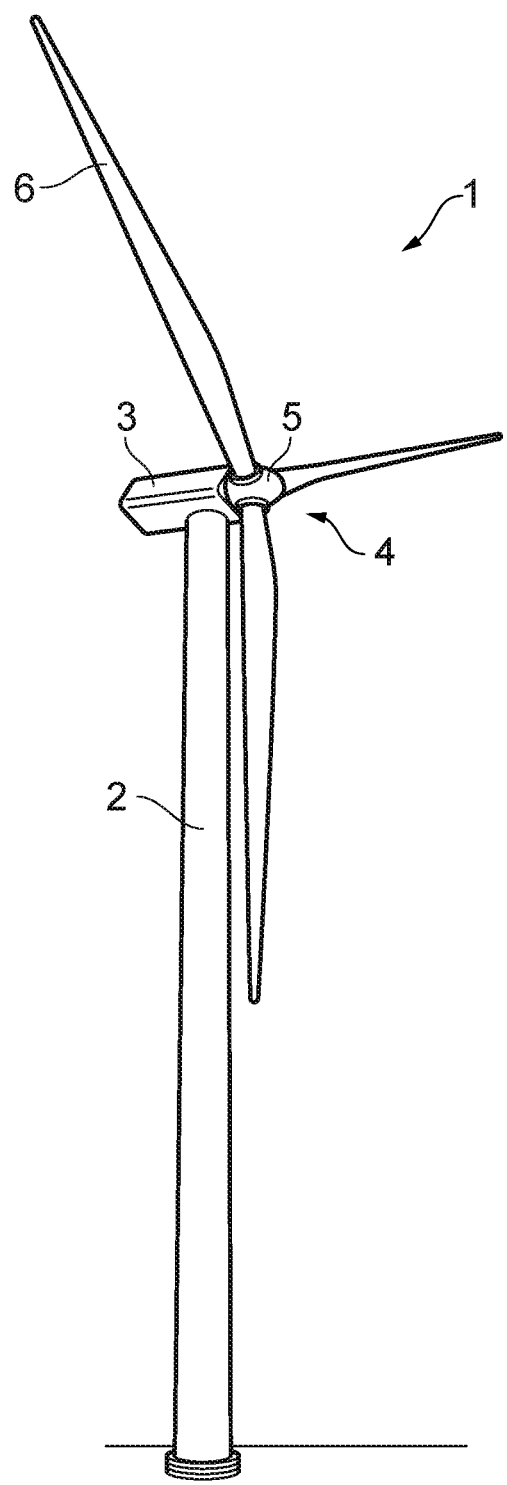
FIG. 1 shows an example schematic drawing of a wind turbine 1.

FIG. 1 illustrates, in a schematic perspective view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous consumers required for converting wind energy into electrical energy and various consumers needed to operate, control, and optimize the performance of the wind turbine 1. The rotor 4 of the wind turbine 1 includes a central hub 5 and a plurality of blades 6 that project outwardly from the central hub 5. In the illustrated embodiment, the rotor 4 includes three blades 6, but the number may vary.

The wind turbine 1 may be included among a collection of other wind turbines belonging to a wind power plant, also referred to as a wind farm or wind park, that serves as a power generating plant connected by transmission lines with an electrical power grid. The electrical power grid generally consists of a network of power stations, transmission circuits, and substations coupled by a network of transmission lines that transmit the power to loads in the form of end users and other customers of electrical utilities. The wind power plant may comprise a power plant controller which may be in charge of controlling certain aspects of the individual turbines.

Figure 2:
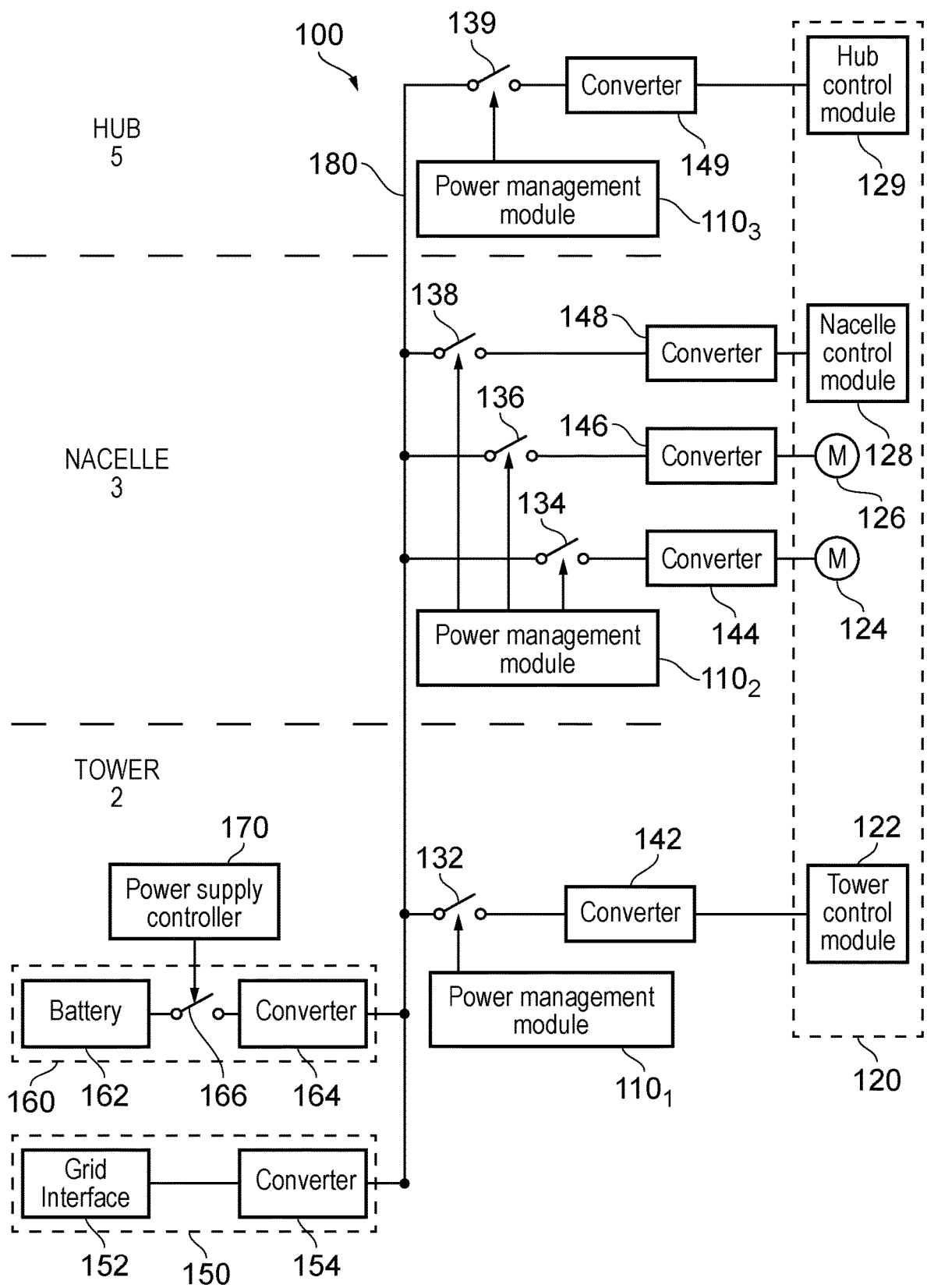
FIG. 2 shows an example schematic diagram of a wind turbine system 100 in accordance with a first aspect of the present disclosure.

FIG. 2 shows an example schematic diagram of a wind turbine system 100 in accordance with a first aspect of the present disclosure. As can be seen, components of the wind turbine system 100 are distributed between the tower 2, the nacelle 3 and the hub 5 of the wind turbine 1. In the tower 2, there is a primary power source 150 comprising a grid interface 152 and a converter 154, and a backup power source 160 comprising a battery 162 and a converter 164. The primary power source 150 and the backup power source are coupled to a power supply bus 180 and are configured to provide power to the power supply bus 180. A power supply controller 170 is configured to engage and disengage the backup power source 160 using the switch 166, for example to engage the backup power source 160 to provide power to the power supply bus 180 during no-grid periods and disengage the backup power source 160 to cease providing power to the power supply bus 180 during grid powered periods. The power supply controller 170 may detect no-grid periods by any suitable means, which are not the subject of the present disclosure. Furthermore, in an alternative, the power supply controller 170 may engage and disengage the backup power source 160 in any other suitable way, for example by controlling the converter 164. In a further alternative, the power supply controller 170 may not be required—instead the backup power source 160 may autonomously engage and disengage as necessary.

The converters 154 and 164 may be of any suitable type to meet the needs of the power supply bus 180. For example, if the power supply bus is a DC bus, the converter 154 may be an AC-DC rectifier configured to supply DC power to the power supply bus 180 at a first power supply voltage, and converter 164 may be a DC-DC converter configured to supply DC power to the power supply bus 180 at a second power supply voltage. By way of non-limiting example, battery 162 may supply 24V DC power to the converter 164, which may convert it to 400V DC power to provide to the power supply bus 180, in order to reduce transmission losses in the power supply bus 180. The first power supply voltage provided by the primary power source 150 is greater than the second power supply voltage provided by the backup power source 160. By way of non-limiting example, the first power supply voltage may be 560V DC and the second power supply voltage may be 400V DC.

In the tower 2, the wind turbine system 100 further comprises a first converter 142 coupled to the power supply bus 180 via a first controllable switch 132. A power management module $110_1$ is coupled to the first controllable switch 132 in order to control the state of the first controllable switch 132 (for example, open or closed). The first converter 142 is configured to supply power to the tower control module 122, which is an example of a consumer 120. The converter 142 may be of any suitable type to provide the required type of power to the tower control module 122. For example, if the tower control module 122 requires 24V DC power, the converter 122 may be a DC-DC converter configured to provide 24V DC to the tower control module 122. If the tower control module 122 requires 16V AC power, the converter 122 may be a DC-AC inverter configured to provide 16V AC to the tower control module 122, etc.

The power management module $110_1$ is configured to determine the voltage level of the power supply bus 180 and control the level of power consumption of the tower control module 122 by controlling the state of the first controllable switch 132. Further details of this operation of the power management module $110_1$, and the other power management modules in the wind turbine system 100 (all of which are referred to generally as power management modules 110) are described later, with reference to FIG. 3.

In the nacelle 3, the wind turbine system 100 further comprises a second converter 144 coupled to the power supply bus 180 via a second controllable switch 134, a third converter 146 coupled to the power supply bus 180 via a third controllable switch 136 and a fourth converter 148 coupled to the power supply bus 180 via a fourth controllable switch 138. A power management module $110_2$ is coupled to each of the switches 134, 136, 138 to control their states. The states of each of the switches 134, 136, 138 may be controlled independently, or they may all be controlled to be the same state as each other. The second converter 144 is configured to supply power to the yaw motor 124, the third converter 146 is configured to supply power to other nacelle motors 126 and the fourth converter 148 is configured to supply power to the nacelle control module 128. The yaw motor 124, other nacelle motors 126 and nacelle control module 128 are all examples of consumers 120. The converters 144, 146, 148 may be of any suitable type (for example, DC-DC, DC-AC, variable frequency, etc), as described above in relation to the first converter 142.

The power management module $110_2$ is configured to determine the voltage level of the power supply bus 180 and control the level of power consumption of the yaw motor 124, other nacelle motors 126 and nacelle control module 128 by controlling the states of the controllable switches 134, 136 and 138.

In the hub 5, the wind turbine system 100 further comprises a fifth converter 149 coupled to the power supply bus 180 via a fifth controllable switch 139. A power management module $110_3$ is coupled to the fifth controllable switch 139 in order to control the state of the fifth controllable switch 139 (for example, open or closed). The fifth converter 149 is configured to supply power to the hub control module 129, which is an example of a consumer 120. The fifth converter 149 may be of any suitable type to provide the required type of power to the hub control module 149, as described above in relation to the first converter 142.

The power management module $110_3$ is configured to determine the voltage level of the power supply bus 180 and control the level of power consumption of the hub control module 129 by controlling the state of the fifth controllable switch 139.

As can be seen, the power supply bus 180 runs the full length of the wind turbine system 100 to provide power to consumers 120 in all parts of the wind turbine.

Each of the controllable switches 132, 134, 136, 138 and 139 may be implemented using any suitable controllable switching devices, for example thyristors, transistors (such as such as BJTs, MOSFETs, JEFTs, IGBTs, etc), mechanical relays, etc.

Figure 3:
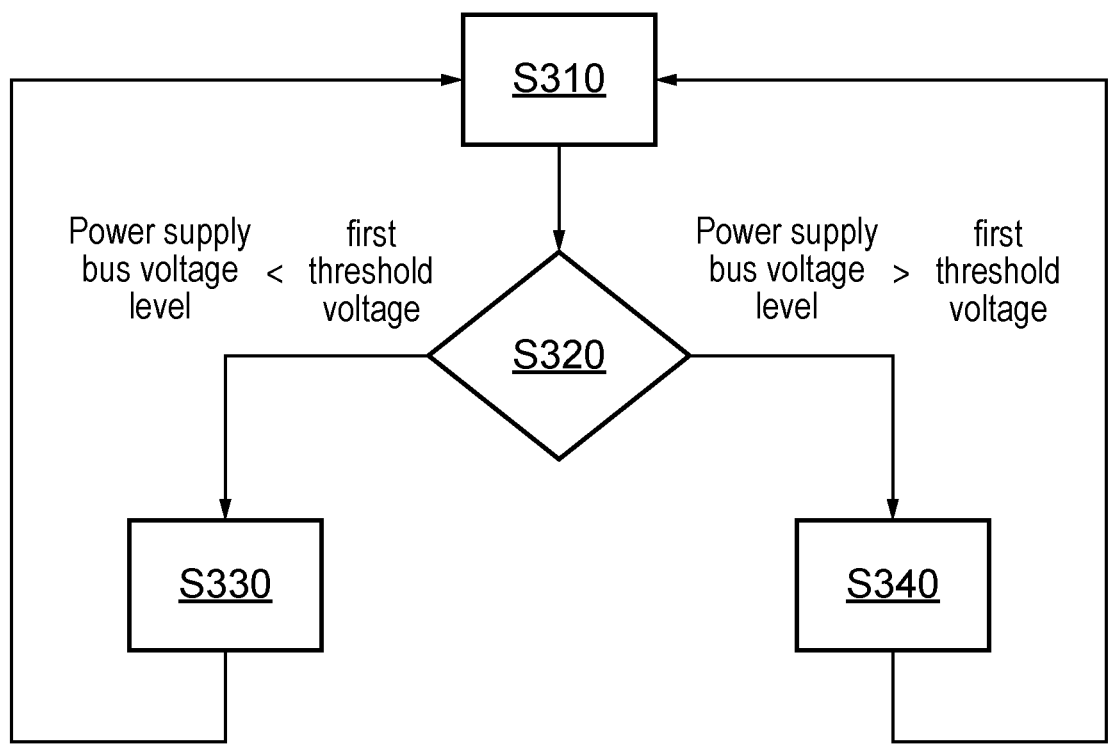
FIG. 3 shows a representation of an example control process performed by a power management module 110 of the wind turbine system of FIG. 2.

FIG. 3 shows a representation of an example control process performed by a power management module 110 (for example, each of the power management modules $110_1$, $110_2$ and $110_3$ represented in FIG. 2) in accordance with the first aspect of the present disclosure. The power management modules 110 represented in FIG. 2 may each independently perform the control process in respect of the one or more consumers for which they are responsible (for example, power management module $110_1$ is responsible for controlling the power consumption of the tower control module 122, power management module $110_2$ is responsible for controlling the power consumption of the yaw motor 124, other nacelle motors 126 and nacelle control module 128, and power management module $110_3$ is responsible for controlling the power consumption of the hub control module 129).

In S310, the power management module 110 determines a voltage level of the power supply bus 180. This may be carried out in any suitable way, for example by receiving a measurement from a separate entity such as a voltmeter, or by virtue of an electrical coupling between the power management module 110 and the power supply bus 180 using which the voltage level can be measured (not represented in FIG. 2 for the sake of simplicity), etc.

In S320, the power management module 110 determines whether the primary power source 150 or the backup power source 160 is providing power to the power supply bus 180. As explained earlier, the primary power source 150 provides power to the power supply bus at a first power supply voltage (for example, 560V DC) and the backup power source 160 provides power to the power supply bus at a second power supply voltage (for example, 400V DC), which is less than the first power supply voltage. To make this determination, the power management module 110 may compare the voltage level of the power supply bus 180 to a first threshold voltage, which is set at any suitable level between the first power supply voltage and the second power supply voltage (for example, the first threshold voltage may be 450V DC). If the voltage level of the power supply bus 180 is less than the first threshold voltage, it is determined that the backup power source 160 is providing power to the power supply bus 180 and the control process proceeds to S330. If the voltage level of the power supply bus 180 is greater than the first threshold voltage, it is determined that the primary power source 150 is providing power to the power supply bus 180 and the control process proceeds to S340.

Each of the consumers 120 can be classified as either essential or non-essential. An essential consumer is one that is deemed essential to the safe operation of the wind turbine 1 and should therefore be powered-on even in no-grid periods. A non-essential consumer is one that is deemed not essential to the safe operation of the wind turbine 1 during no-grid periods and so may be powered-off, or operate at a reduced level of power consumption, during no-grid periods. Each power management module 110 is configured to know if each of the consumers under its control is essential or non-essential, for example by using standard hardware configuration or software programming techniques during set-up of each power management module 110.

In S330, the power management module 110 reduces the level of power consumption of any non-essential consumers under its control to a second power level by opening the controllable switch corresponding to the non-essential consumer(s). If the relevant controllable switch is already open (for example, because the power management module 110 had opened it during an earlier iteration of this control process) such that the consumer is already at the second power level (in this example, turned off), the power management module 110 will maintain the controllable switch in its open position. For any essential consumer(s) that are under the control of the power management module 110, the power management module 110 will maintain that consumer(s) at a first power level (in this example, turned on) by maintaining the corresponding controllable switch in the closed position in order to keep power to that essential consumer(s). By way of non-limiting example, the tower control module 122 may be non-essential, so the power management module $110_1$ would control the first controllable switch 132 to an open state in order to reduce the power consumption of the first converter 142 and the tower control module 122 to the second power level (in this example, turned off). The yaw motor 124 and nacelle control module 128 may be essential consumers, so the power management module $110_2$ will control the second and fourth switches 134 and 138 to a closed state to maintain power to those consumers at the first power level (in this example, turned on), whereas the other nacelle motors 126 may be non-essential, so the power management module $110_3$ will control the third controllable switch 136 to an open state, to reduce the power consumption of the third converter 146 and other nacelle motors 126 to the second power level.

Whilst in the above, and generally throughout this disclosure, the "first power level" for a consumer is described as "powered-on", or non-zero power consumption, and the "second power level" for a consumer is described as "powered-off", or zero power consumption, it should be appreciated that this is merely one example of first and second power levels and the present disclosure is not limited only to this example. In an alternative, both the first and second power levels may be non-zero, with the second power level being less than the first power level. In particular, where the controllable switches are semiconductor switches, the power management modules 110 may control the consumers 120 between the first power level and the second power level by controlling the level of conduction of the semiconductor switches in order to increase or decrease current flow to the consumers 120 (and therefore increase or decrease their power consumption between non-zero levels of power consumption), based on the voltage level of the power supply bus 180. Alternatively, the power management modules 110 may perform power management in any other way, for example by controlling the operation of the consumers 120 to operate at the first power level (non-zero power consumption) or the second power level (zero power consumption, or non-zero power consumption that is lower than the power consumption at the first power level), in which case the controllable switches may optionally be omitted.

In S340, the power management module increases the level of power consumption of any non-essential consumer(s) under its control to the first power level by closing the controllable switch(es) corresponding to the non-essential consumer(s). If the relevant controllable switch(es) is already closed, the power management module 110 will maintain the controllable switch in its closed position. For any essential consumer(s) that is under the control of the power management module 110, the power management module 110 will maintain that consumer(s) at the first power level by setting the corresponding controllable switch(es) to the closed position in order to maintain power to the essential consumers.

Thus, it can be seen that S340 corresponds to grid-powered periods (which are generally expected to be the normal condition for the wind turbine system 100) and the consumers 120 are controlled to operate in a normal way. S330 corresponds to no-grid periods (which are generally expected to be an abnormal condition for the wind turbine system 100) and the power management modules 110 reduce the overall power consumption of the wind turbine system by controlling the power consumption of the consumers, thereby reducing energy consumption from the battery 162 and extending the amount of time the essential consumers can remain powered in no-grid periods.

Control of the level of power consumption of the consumers is achieved in a distributed way across all parts of the wind turbine 1. In particular, each of the power management modules 110 autonomously controls the level of power consumption of each of its one or more consumers based on the voltage level of the power supply bus 180. Consequently, when the power supply source changes, the level of power consumption may be adjusted autonomously by the power management modules as necessary, without requiring complex and expensive centralised power control and communications infrastructure (for example, an alternative arrangement may require the implementation of a centralised controller coupled to controllers in each part of the wind turbine 1 via an Ethernet cabling infrastructures, which would require rotating type couplings for Ethernet connections into the nacelle 2 and hub 5. This would be expensive and difficult to achieve). Thus, power management control may be achieved more straightforwardly by implementing at least one stand-alone power management module 110 in each part of the wind turbine 1 that has consumers to be controlled, those power management modules 110 operating based on the voltage level of the power supply bus, meaning that no further changes to a standard wind turbine system would be needed.

After completion of S330 or S340, the control process returns to S310, so that the voltage level of the power supply bus 180 can be continually monitored and the power consumption of consumers 120 controlled accordingly.

Figure 4:
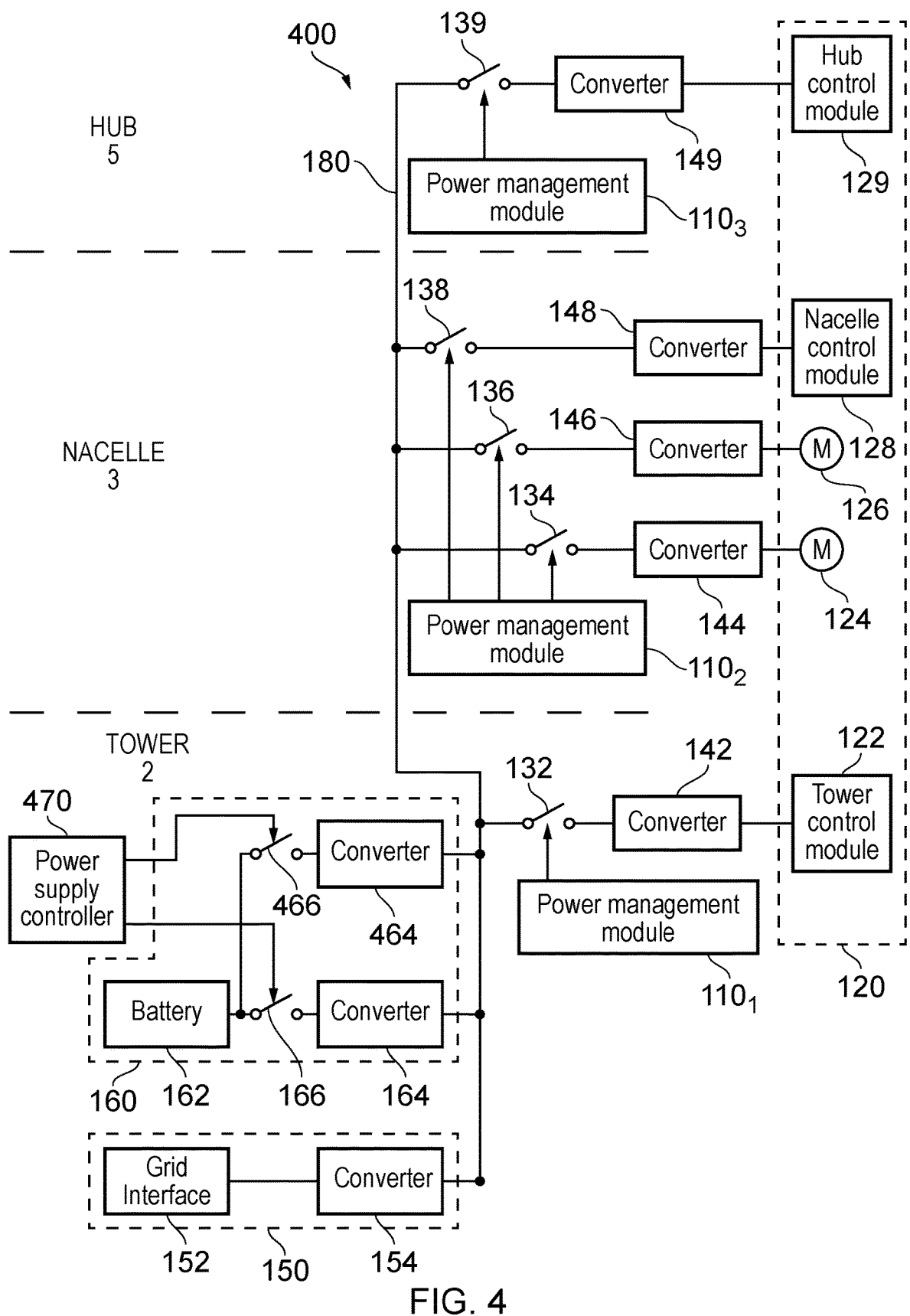
FIG. 4 shows an example schematic diagram of a wind turbine system 400 in accordance with a second aspect of the present disclosure.

FIG. 4 shows an example schematic diagram of a wind turbine system 400 in accordance with a second aspect of the present disclosure. The wind turbine system 400 is the same as the wind turbine system 100, except for the backup power source 460 and the power supply controller 470.

The backup power source 460 is very similar to backup power source 160, but further comprises a converter 464 and a controllable switch 466. The converter 464 may be of any suitable type, for example a DC-DC converter, is configured to provide power to the power supply bus 180 at a third power supply voltage, which is less than the second power supply voltage provided by the converter 164. By way of non-limiting example, the second power supply voltage provided by the converter 164 may be 400V DC and the third power supply voltage provided by the converter 464 may be 350V DC.

The power supply controller 470 is configured not only to control whether or not power is being provided to the power supply bus 180 by the backup power source 160 (as is the case for the power supply controller 170), but also to control, in the event that backup power is to be used, which of the converters 164 or 464 provide the backup power to the power supply bus 180. The power supply controller 470 may be configured to perform this control based at least in part on the remaining energy stored in the battery 162 (for example, by monitoring energy storage levels using any standard techniques). In particular, if the energy storage level exceeds an energy storage threshold (such as 50% of the full battery capacity), the battery 162 may be assumed to have a good level of energy remaining. In this case the power supply controller 470 may close switch 166 and open switch 466 so that power is provided to the power supply bus 180 by the converter 164 at the second voltage level. If the energy storage level is less than the energy storage threshold, the battery 162 may be assumed to have a low level of energy remaining. In this case, the power supply controller 470 may open switch 166 and close switch 466 so that power is provided to the power supply bus 180 by the converter 464 at the third voltage level. It will be appreciated that in an alternative, the power supply controller 470 may set the power supply voltage provided by the backup power source 160 in any other suitable way, for example by controlling the converters 164 and 464, or by adjusting the output level of a single converter within the backup power source 160, etc. In a further alternative, the backup power source 160 may autonomously control its output power supply voltage, based, for example, on the level of remaining stored energy in the battery 162.

In this second aspect of the disclosure, the power management modules 110 are further refined to determine at which of the first, second or third power supply voltages the power supply bus is and control the level of power consumption of the consumer(s) under its control accordingly. This shall be described in more detail now with reference to FIG. 5.

Figure 5:
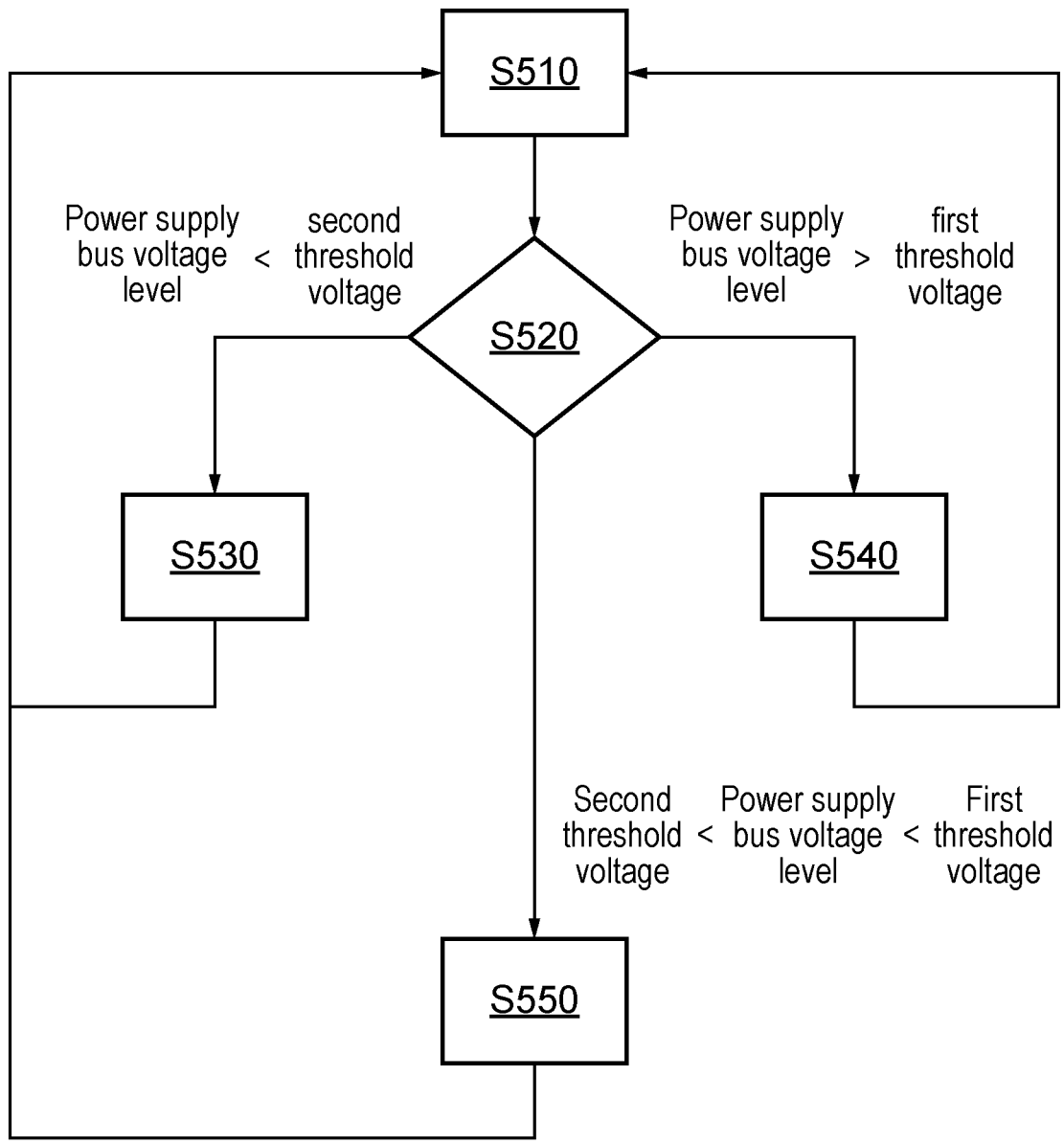
FIG. 5 shows a representation of an example control process performed by a power management module 110 of the wind turbine system of FIG. 4.

FIG. 5 shows a representation of an example control process performed by each power management module 110 (for example, each of the power management modules $110_1$, $110_2$ and $110_3$ represented in FIG. 4) in accordance with the second aspect of the present disclosure. The power management modules 110 may perform the control process in respect of each of the one or more consumers for which they are responsible.

Figure 6:
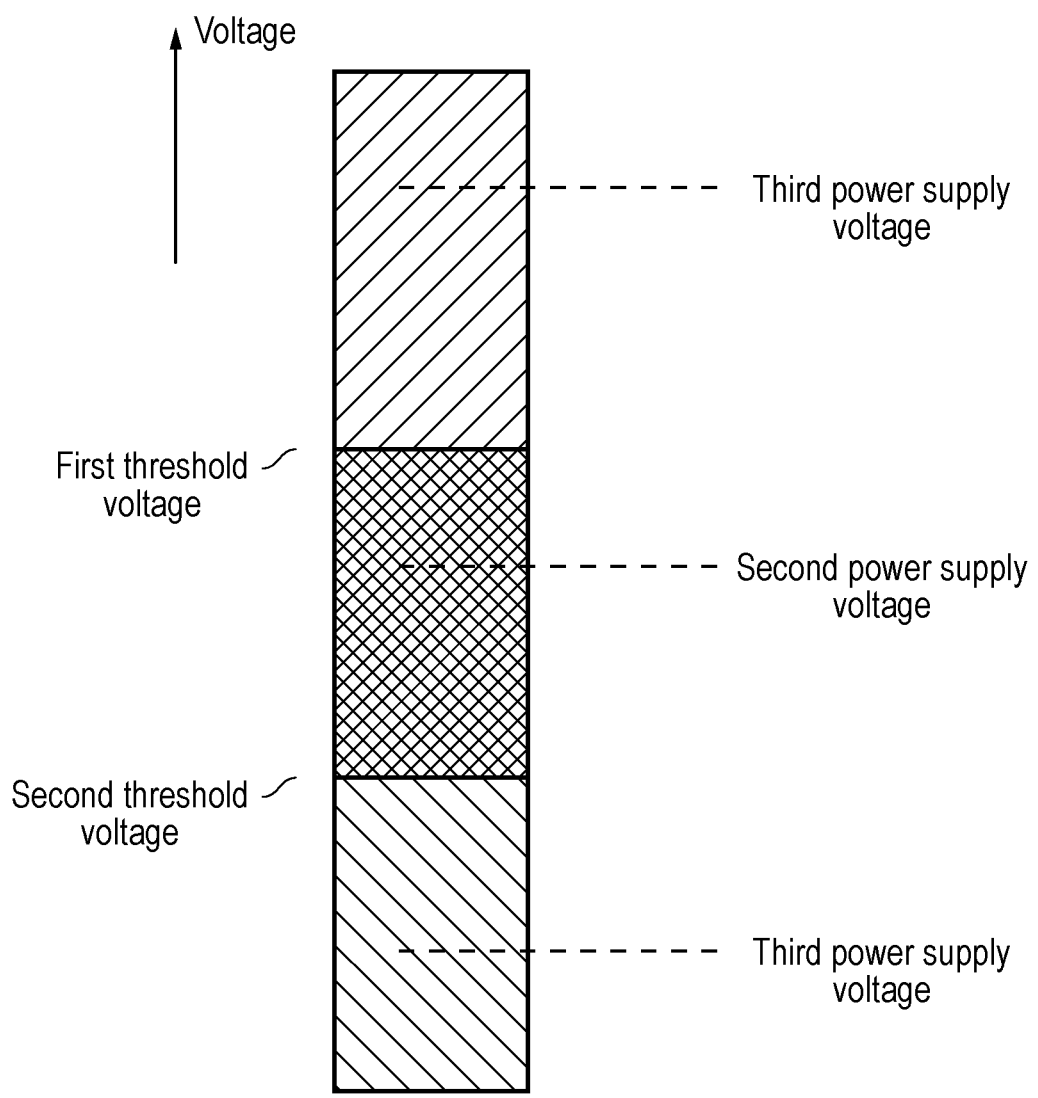
FIG. 6 shows an example representation of the different threshold voltages used by the power management module 110.

In S510, the power management module 110 determines a voltage level of the power supply bus 180. This is the same as S310 described above with respect to FIG. 3. This may be carried out in any suitable way, for example by receiving a measurement from a separate entity such as a voltmeter, or by virtue of an electrical coupling between the power management module 110 and the power supply bus 180 using which the voltage level can be measured (not represented in FIG. 4 for the sake of simplicity), etc In S520, the power management module 110 determines whether the voltage level of the power supply bus 180 is at the first power supply voltage (i.e., provided by the primary power source 150), the second power supply voltage (i.e., provided by the converter 164 of the backup power source 160) or the third power supply voltage (i.e., provided by the converter 464 of the backup power source 160). The power management module 110 may do this by comparing the voltage level of the power supply bus 180 to a first threshold voltage, which is set at any suitable level between the first power supply voltage and the second power supply voltage (as described earlier with respect to S310 of FIG. 3), and comparing the voltage level of the power supply bus 180 to a second threshold voltage, which is set at any suitable level between the second power supply voltage and the third power supply voltage. By way of non-limiting example, the power supply voltages and threshold voltages may be as follows:

First power supply voltage=560V DC
First threshold voltage=450V DC
Second power supply voltage=400V DC
Second threshold voltage=370V DC
Third power supply voltage=350V DC FIG. 6 shows an example representation of the different power supply voltages and threshold voltages.

If the voltage level of the power supply bus 180 is less than the second threshold voltage, it is determined that the backup power source 160 is providing power to the power supply bus 180 at the third power supply voltage and the control process proceeds to S530. If the voltage level of the power supply bus 180 is greater than the second threshold voltage and less than the first threshold voltage, it is determined that the backup power source 160 is providing power to the power supply bus 180 at the second power supply voltage and the control process proceeds to S550. If the voltage level of the power supply bus 180 is greater than the first threshold voltage, it is determined that the primary power source 150 is providing power to the power supply bus 180 and the control process proceeds to S540.

As explained earlier in respect of FIG. 3, each of the consumers 120 can be classified as either essential or non-essential. However, as a further refinement, each of the non-essential consumers can be further classified as a low importance non-essential consumer or a high importance non-essential consumer. High importance non-essential consumers are non-essential consumers that can be turned off, or operated at a low level of power consumption, during no-grid periods, but are preferably left on, or operated at a normal level of power consumption, for as long as possible, for example to simplify and speed up the process of returning to normal operation if grid power quickly returns. Therefore, they may be classified as "high-importance" within the group of non-essential consumers. Low importance non-essential consumers are consumers that can be turned off, or operated at a low level of power consumption, during no-grid periods and are typically the least important consumers for safe, no-grid operation. Therefore, they may be classified as "low-importance" within the group of non-essential consumers and consequently be turned off, or controlled to low power consumption levels, first in the event of a no-grid period. Each power management module 110 is configured to know if each of the consumers under its control is essential, high-importance non-essential or low-importance non-essential, for example by using standard hardware configuration or software programming techniques during set-up of the power management modules 110.

In S530, where the backup power source 160 is providing power at the third power supply voltage (the lowest voltage), the power management module 110 reduces the level of power consumption of both low importance and high importance non-essential consumers under its control to the second power level by opening the controllable switch corresponding to those non-essential consumer(s). If the relevant controllable switch(es) is already open (for example, because the power management module 110 had opened it during an earlier iteration of this control process), the power management module 110 will maintain the controllable switch in its open position. For any essential consumers that are under the control of the power management module 110, the power management module 110 will maintain the corresponding controllable switch in the closed position in order to maintain those essential consumers at the first power level (in this example, powered-on). Consequently, this part of the control process is very similar to S330 described above with reference to FIG. 3.

In S540, where the primary power source 150 is providing power at the first power supply voltage (the highest voltage), the power management module 110 increases the level of power consumption of both high importance and low importance non-essential consumers under its control to the first power level by closing the controllable switch(es) corresponding to the non-essential consumer(s). If the relevant controllable switch is already closed, the power management module 110 will maintain the controllable switch in its closed position. For any essential consumers that are under the control of the power management module 110, the power management module 110 will maintain the corresponding controllable switch in the closed position in order to maintain the essential consumers at the first power level. Consequently, this part of the control process is very similar to S340 described above with reference to FIG. 3.

In S550, where the backup power source 160 is providing power at the second power supply voltage (the mid-level voltage), the power management module 110 reduces the level of power consumption of low importance non-essential consumers under its control to the second power level by opening the controllable switches corresponding to those low importance non-essential consumers. If the relevant controllable switch(es) is already open (for example, because the power management module 110 had opened it during an earlier iteration of this control process), the power management module 110 will maintain the controllable switch in its open position. For any high importance non-essential consumers, or essential consumers, that are under the control of the power management module 110, the power management module 110 will close, or maintain in a closed position, the corresponding controllable switch(es) to increase or maintain those consumers at the first power level.

Thus, it may be seen that when the voltage level of the power supply bus 180 is less than the second threshold voltage, the level of power consumption of the high-importance non-essential consumers is reduced. When it is greater than the second threshold voltage, the level of power consumption of the high-importance non-essential consumers is increased. When the voltage level of the power supply bus 180 is less than the first threshold voltage, the level of power consumption of the low-importance non-essential consumers is reduced. When it is greater than the second threshold voltage, the level of power consumption of the low-importance non-essential consumers is increased. Consequently, when the voltage level of the power supply bus 180 is at its lowest level (i.e., the third power supply voltage), the level of power consumption of the wind turbine system 400 may be minimised by reducing the power consumption of all consumers other than essential consumers. When the voltage level of the power supply bus 180 is at its highest level (i.e., the first power supply voltage), the wind turbine system 400 operates normally with all consumers powered. When the voltage level of the power supply bus 180 is at its mid-level (i.e., the second power supply voltage), the wind turbine system 400 may operate at a reduced power consumption level, but not at its minimum level, with all consumers other than low-importance non-essential consumers being powered.

Consequently, by introducing two different levels of power supply voltage from the backup power source 160, finer control of the power consumption of the wind turbine system 400 may be achieved. In particular, when the wind turbine system 400 initially switches to backup power, it is likely that the battery 162 will be well charged. In this case, it is helpful to reduce the overall power consumption, but significant reduction in power consumption is not yet critical. Therefore, it is possible to turn off the least importance consumers (i.e., the low importance non-essential consumers), but keep on all other consumers so that the wind turbine system 400 can operate as normally as possible. The longer a no-grid period lasts, the lower the energy storage level of the battery 162 will become. Eventually, it may become critical to minimise power consumption in order to preserve the functioning of the essential consumers for as long as possible. At this point, the backup power source 160 may be switched to provide power at the lowest voltage (the third voltage level), causing all consumers except for essential consumers to be turned off, in order to minimise power consumption of the wind turbine system 400 and maximise safe operation time during a prolonged no-grid period.

Therefore, a finer level of distributed control ay be achieved, without requiring a dedicated central control system and infrastructure.

It will be appreciated that in the above example, three different levels of system power consumption are described, each corresponding to a different power supply voltage level. However, any number of different power supply voltage levels may be utilised in order to achieve an even finer level of decentralised power control.

Figure 7:
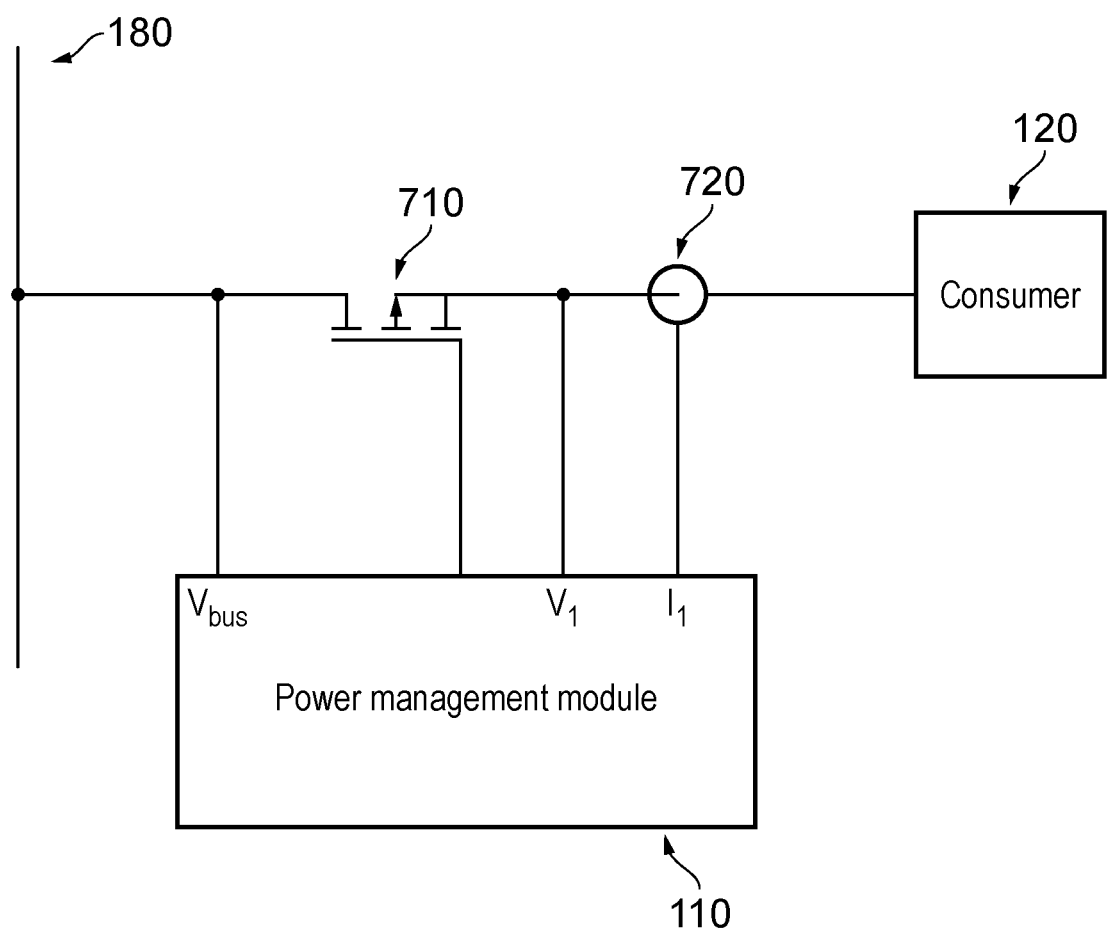
FIG. 7 shows an example schematic diagram of further details of the power management module 110 of FIG. 2 or 4.

FIG. 7 shows an example schematic diagram of further details of the power management module 110 of the present disclosure. In this example, the power management module 110 controls an IGBT 710, which is a particular example a controllable switch 132, 134, 136, 138 or 139. However, it will be appreciated that the IGBT may 710 alternatively be any other suitable type of controllable switch. FIG. 7 includes a representation of a consumer 120, but does not also include a representation of a converter for the sake of simplicity.

The power management module 110 may determine the voltage level of the power supply bus 180 by measuring the voltage on the $V_{bus}$ terminal of the power management module 110. Based on the voltage level of the power supply bus 180, the power management module 110 can turn-on or turn-off the IGBT 710 as necessary by controlling the gate voltage on the IGBT 710 in order to control the level of power consumption of the consumer 120, as described above.

In the particular implementation of the power management module 110 represented in FIG. 7, the power management module 110 is also configured to determine the voltage level at the input of the consumer 120 by measuring the voltage on the $V_1$ terminal and to determine the current, $I_1$, at the input of the consumer 120 using the current transformer 720 (although it will be appreciated that the voltage and current at the input to the consumer 120 may alternatively be determined in any other suitable way). The determined voltage and current at the input of the consumer 120 may be used by the power management module 110 to perform any one or more of the following operations:

a) Protection against current inrush to consumers. When the IGBT 710 is being controlled from an off-state to an on-state, current will start to flow from the power supply bus 180 to the consumer 120. If the consumer 120 has a capacitive load, current inrush may be significant and cause damage to the consumer 120. Therefore, the power management module 110 may monitor the level of current $I_1$ and adjust the level of conduction of the IGBT 710 accordingly to limit the current $I_1$ to acceptable levels, thereby providing protection against current inrush to the consumer 120.

b) Overload protection (for example, overcurrent or overvoltage protection). The power management module 110 may monitor the voltage $V_1$ and current $I_1$ at the input of the consumer 120 and perform overload protection by controlling the state of the IGBT 710. For example, if there is a power surge on the power supply bus 180, the voltage $V_1$ and/or current $I_1$ at the input of the consumer 120 may start to rise to dangerous levels, at which time the power management module 110 may turn-off the IGBT 120 in order to isolate the consumer 120 from the power supply bus 180, thereby protecting the consumer 120. The threshold for what levels of voltage and/or current are considered to be dangerous may change depending on which of the power sources 150 or 160 are providing power to the power supply bus 180. For example, if the power management module 110 has determined (using the techniques described earlier) that the primary power source 150 is providing power to the power supply bus 180, a relatively high dangerous threshold of voltage or current may be set (for example, 100 A, etc). If the power management module 110 has determined that the backup power source 160 is providing power to the power supply bus 180, a relatively low dangerous threshold of voltage or current may be set (for example, 30 A, etc). Consequently, more refined overload protection may be achieved by the power management modules 110 throughout the wind turbine system 100 and 400 in a distributed, non-centralised manner.

c) Load shedding. Where the power management module 110 is controlling the level of power consumption of two or more consumers 120 (for example, power management module $110_2$ in FIGS. 2 and 4), the power management module 110 may monitor the combined power consumption of all of those consumers 120 by monitoring the voltage and current $I_1$ at the input to each of those consumers 120. If the overall power consumption is deemed to be too high, the power management module 110 may perform load shedding by controlling the IGBTs 710 to turn off consumers 120 according to a defined priority order. When power consumption is determined to have reached an acceptable level, the power management module 110 may then cease load shedding. This load shedding technique may be used as a more sophisticated power management technique than the more straightforward essential/non-essential consumer technique described earlier. For example, when the power management module 110 determines that the backup power source 160 is providing power to the power supply bus 180, it may then use a lower threshold for what constitutes an acceptable level of power consumption across all of the consumers 120 under its control. It may then turn off consumers according to a defined priority order until the overall level of power consumption is below the threshold level. In this way, it is possible that some non-essential consumers may be kept on (where they might otherwise be turned off according to the process described earlier), whilst still achieving an acceptable reduction in power consumption of the wind turbine system 100 or 400.

Optionally, where the power management module 110 is controlling the level of power consumption of two or more consumers 120, it may be further configured to stagger in time the reconnection of consumers 120 to the power supply bus 180. For example, if a power management module 110 is controlling the level of power consumption of two or more non-essential consumers and it has previously disconnected those consumers 120, if the power management module 110 then later detects that the primary power source 150 has resumed providing power to the power supply bus 180, rather than reconnecting all of the consumers 120 at once, it may reconnect them in a staggered manner. This may help to provide overload protection, since reconnecting multiple consumers 120 all at once may cause a transient change in voltage/current on the power supply bus 180, which may in turn result in a dangerous overload (i.e., overvoltage/overcurrent) situation for any of the consumers 120 coupled to the power supply bus 180. By staggering in time each reconnection, changes in the level of power drawn from the power supply bus 180 may be more gradual, thereby protecting the consumers 120 from overload conditions.

Although the invention has been described above with reference to one or more preferred embodiments, it will be appreciated that various changes or modifications may be made without departing from the scope of the invention as defined in the appended claims.

For example, whilst in the above description the power supply bus 180 is generally referred to as carrying DC power, in an alternative it may carry AC power. Furthermore, at least some of the converters 154, 164, 464, 142, 144, 146, 148 and 149 may not be needed, depending on the requirements of the consumers 120 and the nature of the power sources and the power supply bus 180.

Whilst in the above description the power management modules 110 control the level of power consumption of one or more consumers 120 between a first power level and a second power level, the power management modules 110 may alternative control power consumption between more than two different levels, particularly where there are more than two power supply voltages available.

Whilst FIGS. 2 and 4 both show a single power management module 110 in each part of the wind turbine (for example, the tower 2, nacelle 3 and hub 5), in at least one part of the wind turbine there may be two or more power management modules 110, each controlling the level of power consumption of one or more different consumers 120. Furthermore, at least one part of the wind turbine may not have any power management module 110 at all, for example if all of the consumers 120 in that part are essential consumers.

In the above description, the power management modules 110 generally control the level of power consumption of consumers by comparing the voltage level of the power supply bus 180 against one or more threshold voltages. However, control of the level of power consumption may be performed based on the voltage level of the power supply bus 180 in any other suitable way, for example power consumption of at least some consumers may be adjusted proportionately with the voltage level of the power supply bus 180.

As part of the optional functionalities of the power management module 110 described above with reference to FIG. 7, it is explained that both the voltage and the current input to the consumer 120 are measured. However, in an alternative, the power management module 110 may determine the voltage and/or the current input to the consumer 120 and carry out at least some of the described optional functionality on the basis of those measurements.

Whilst the power management module 110 is represented in FIGS. 2, 4 and 7 as a single unit, it will be appreciated that each power management module 110 may comprise two or more different elements/parts/units that are interconnected and configured to perform the functionality described above. Furthermore, each power management module 110 may comprise a processor and memory, so that the process is capable of executing computing tasks based on instructions stored in the memory. The memory may be any suitable computer readable medium, for example a non-transitory computer-readable medium, such as read-only memory, random access memory, CD-ROMs, DVDs, Blue-rays, magnetic tape, hard disk drives, solid state drives and optical drives. Alternatively, the functionality of the power management module 110 may be implemented by hardware (for example, using hardwired or configurable logic) or a combination of software and hardware.

The invention claimed is:

1. A power management module for a wind turbine system comprising one or more consumers, the power management module being configured to:
    determine a change in a voltage level of a power supply bus of the wind turbine system; and
    in response to the determined change in the voltage level of the power supply bus, adjust a level of power consumption of each of the one or more consumers coupled to the power supply bus.

2. The power management module of claim 1, wherein:
    adjustment of the level of power consumption of each of the one or more consumers is based at least in part on a comparison of the voltage level of the power supply bus against a first threshold voltage.

3. The power management module of claim 2, wherein at least one of the one or more consumers is a non-essential consumer, and wherein,
    if the voltage level of the power supply bus is greater than the first threshold voltage, the power management module is configured to adjust the level of power consumption of the non-essential consumer to a first power level; and
    if the voltage level of the power supply bus is less than the first threshold voltage, the power management module is configured to adjust the level of power consumption of the non-essential consumer to a second power level, and wherein
    the first power level is greater than the second power level.

4. The power management module of claim 2, wherein:
    adjustment of the level of power consumption of each of the one or more consumers is further based at least in part on a comparison of the voltage level of the power supply bus against a second threshold voltage, and wherein
    the first threshold voltage is greater than the second threshold voltage.

5. The power management module of claim 4, further configured to adjust the level of power consumption of each of the one or more consumers between a first power level and a second power level,
    wherein the first power level is greater than the second power level.

6. The power management module of claim 5, wherein at least one of the one or more consumers is a low-importance non-essential consumer, and wherein,
    if the voltage level of the power supply bus is less than the first threshold voltage, the power management module is configured to adjust the level of power consumption of the low-importance non-essential consumer to the second power level, and wherein
    if the voltage level of the power supply bus is greater than the second threshold voltage, the power management module is configured to adjust the level of power consumption of the low-importance non-essential consumer to the first power level.

7. The power management module of claim 5, wherein at least one of the one or more consumers is a high-importance non-essential consumer, and wherein,
    if the voltage level of the power supply bus is less than the second threshold voltage, the power management module is configured to adjust the level of power consumption of the high-importance non-essential consumer to the second power level, and wherein
    if the voltage level of the power supply bus is greater than the second threshold voltage, the power management module is configured to adjust the level of power consumption of the high-importance non-essential consumer to the first power level.

8. The power management module of claim 1, wherein the one or more consumers are coupled to the power supply bus by respective one or more controllable switches, and wherein the power management module is configured to control the one or more controllable switches to adjust the level of power consumption of each of the one or more consumers.

9. The power management module of claim 8, further configured to:
   determine a voltage level and/or a current at an input of each of the one or more consumers;
   wherein adjustment of the level of power consumption of each of the one or more consumers is further based at least in part on the determined voltage level or current at the input of each of the one or more consumers.

10. The power management module of claim 9, wherein each of the one or more controllable switches comprises a transistor, and wherein
   the power management module is further configured to:
   when controlling a transistor to couple a consumer to the power supply bus, control a level of conduction of the transistor based on the determined voltage level and/or current at the input of the consumer to protect against current inrush to the consumer.

11. The power management module of claim 8, further configured to:
   when controlling the switches of a plurality of consumers to couple the plurality of consumers to the power supply bus, stagger in time the coupling of at least some of the consumers so as to provide overload protection for the power supply bus.

12. A wind turbine system comprising:
   a power supply bus;
   one or more consumers coupled to the power supply bus;
   the power management module of any preceding claim to adjust a level of power consumption of each of the one or more consumers in response to a determined change in a voltage level of the power supply bus;
   a primary power source coupled to the power supply bus for providing a first power supply voltage; and
   a backup power source coupled to the power supply bus for providing a second power supply voltage in the event of a failure in the primary power source, wherein the first power supply voltage is greater than the second power supply voltage.

13. The wind turbine system of claim 12, wherein the backup power source is further configured to provide either the second power supply voltage or a third power supply voltage to the power supply bus, wherein the second power supply voltage is greater than the third power supply voltage.

14. The wind turbine system of claim 13, wherein the backup power source comprises a battery and wherein the wind turbine system is further configured to control the backup power source to provide either the second power supply voltage or the third power supply voltage to the power supply bus based at least in part on the remaining energy stored in the battery.

15. A method for controlling a level of power consumption of one or more consumers in a wind turbine system, the method comprising:
   determining a change in a voltage level of a power supply bus of the wind turbine system; and
   in response to the determined change in the voltage level of the power supply bus, adjusting a level of power consumption of each of the one or more consumers coupled to the power supply bus.

16. The method of claim 15, wherein:
   adjustment of the level of power consumption of each of the one or more consumers is based at least in part on a comparison of the voltage level of the power supply bus against a first threshold voltage.

17. The method of claim 16, wherein at least one of the one or more consumers is a non-essential consumer, and wherein the method further comprises:
   if the voltage level of the power supply bus is greater than the first threshold voltage, adjusting the level of power consumption of the non-essential consumer to a first power level; and
   if the voltage level of the power supply bus is less than the first threshold voltage, adjusting the level of power consumption of the non-essential consumer to a second power level, and wherein
   the first power level is greater than the second power level.

18. The method of claim 16, wherein:
   adjustment of the level of power consumption of each of the one or more consumers is further based at least in part on a comparison of the voltage level of the power supply bus against a second threshold voltage, and wherein
   the first threshold voltage is greater than the second threshold voltage.

19. The method of claim 18, further comprising adjusting the level of power consumption of the one or more consumers between a first power level and a second power level, wherein the first power level is greater than the second power level.

20. The method of claim 19, wherein at least one of the one or more consumers is a low-importance non-essential consumer, and wherein the method further comprises:
   if the voltage level of the power supply bus is less than the first threshold voltage, adjusting the level of power consumption of the low-importance non-essential consumer to second power level, and wherein
   if the voltage level of the power supply bus is greater than the second threshold voltage, adjusting the level of power consumption of the low-importance non-essential consumer to the first power level.

* * * * *